United States Patent
Katsube et al.

(10) Patent No.: US 6,185,213 B1
(45) Date of Patent: Feb. 6, 2001

(54) PACKET TRANSFER CONTROL METHOD AND NODE DEVICE USING PLURALITY OF DEDICATED CUT-THROUGH PATHS

(75) Inventors: Yasuhiro Katsube; Hisako Tanaka; Kenichi Nagami, all of Tokyo (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 08/960,429

(22) Filed: Oct. 29, 1997

(30) Foreign Application Priority Data

Oct. 29, 1996 (JP) .................................................. 8-287064

(51) Int. Cl.[7] .............................. H04L 5/14; H04L 5/16; H04J 5/00
(52) U.S. Cl. .......................... 370/397; 370/395; 370/396
(58) Field of Search .................................. 370/395, 396, 370/397, 389, 466, 401, 409

(56) References Cited

U.S. PATENT DOCUMENTS

| | | | |
|---|---|---|---|
| 5,457,679 | * 10/1995 | Eng et al. | 370/395 |
| 5,905,725 | * 5/1999 | Sindhu et al. | 370/389 |
| 6,009,097 | * 12/1999 | Han | 370/395 |

OTHER PUBLICATIONS

Y. Rekhter, et al., "Tag Switching Architecture Overview", 'ETF Internet–Draft Sep., 1996.

* cited by examiner

Primary Examiner—Chi H. Pham
Assistant Examiner—Brenda H. Pham
(74) Attorney, Agent, or Firm—Foley & Lardner

(57) ABSTRACT

A packet transfer control method and a node device which are capable of providing a dedicated cut-through path for a specific end-to-end packet flow, while reducing a time required until the cut-through path is established, so as to be able to reduce the load of the address analysis processing at the router. One node belonging to one logical network stores an information indicating an existence of a first dedicated virtual path for transferring packet flows specified by a first condition, which is capable of transferring packets without applying a network layer processing up to another node belonging to another logical network, and the communicates an identifier information for identifying a second dedicated virtual path for transferring a packet flow specified by a second condition which is more specific than the first condition by utilizing the first dedicated virtual path, and a condition information for indicating the second condition, in order to set up the second dedicated virtual path up to a termination point node of the first dedicated virtual path or a further downstream side node, between that one node and the termination point node.

14 Claims, 11 Drawing Sheets

FIG. 3

| SOURCE IP ADDRESS | DESTINATION IP ADDRESS | OUTPUT I/F | OUTPUT VPI/VCI | VIRTUAL NEXT-HOP |
|---|---|---|---|---|
| * | f.* | 2 | 0/100 | d.204 |
| a.211 | f.221 | 2 | 0/300 | -- |
| * | g.* | 2 | 0/500 | c.203 |

FIG. 5

| INPUT | | OUTPUT | |
|---|---|---|---|
| I/F | VPI/VCI | I/F | VPI/VCI |
| 1 | 1/501 | 2 | 0/301 |

FIG. 8

| INPUT | | OUTPUT | |
|---|---|---|---|
| I/F | DVLI-A/B | I/F | DVLI-A/B |
| 1 | A1/* | 2 | A2/* |

FIG. 9

| INPUT | | OUTPUT | |
|---|---|---|---|
| I/F | DVLI-A/B | I/F | DVLI-A/B |
| 1 | A0 / B501 | 2 | A1 / B301 |

FIG. 10

| SOURCE IP ADDRESS | DESTINATION IP ADDRESS | OUTPUT I/F | OUTPUT DATALINK HEADER (DVLI-A / DVLI-B) | VIRTUAL NEXT-HOP |
|---|---|---|---|---|
| * | f.* | 2 | A1 / B100 | d.204 |
| a.211 | f.221 | 2 | A1 / B300 | -- |
| * | g.* | 2 | A1 / B500 | c.203 |

PACKET TRANSFER CONTROL METHOD AND NODE DEVICE USING PLURALITY OF DEDICATED CUT-THROUGH PATHS

BACKGROUND OF THE INVENTION

1. Field of the Invention

The present invention relates to a node device (including a router device for relaying packets) for transferring packets from one logical network to another logical network, and a packet transfer control method to be carried out at a node device.

2. Description of the Background Art

In the packet communication network for transferring packets on a network layer such as that of the Internet protocol, logical networks are defined. Within the same logical network, the packet transfer is carried out in a prescribed frame format according to a protocol (Ethernet, point-to-point link, ATM, frame relay, etc.) of a datalink layer constituting that logical network.

On the other hand, in a case of transferring a packet to the different logical network, an address information of the packet is analyzed at a router located on a boundary between logical networks, and the packet is relayed by being transferred toward a prescribed logical network. Consequently, a packer relay transfer processing based on the address analysis at a router will be carried out as many times as a number of logical network boundaries that the packet passes through.

As the datalink network constituting individual logical network becomes faster, there arises a problem that such a relay transfer processing based on the address analysis at a router becomes a bottleneck for the overall transfer performance. In order to resolve this problem, there has been a proposition of a method for carrying out a cut-through transfer in which the address analysis processing for each packet at a router is not required so as to significantly improve a router processing performance, as described in detail in the IETF RFC 1953 and 1954.

At a router that carries out this cut-through transfer scheme, the information such as an address and an upper level protocol is analyzed for the first one or few packets, and prescribed control messages are exchanged with a neighboring router (a previous or next hop router belonging to the identical logical network) on a route of the analyzed packet flow so as to store the information on the analyzed packet flow by mapping it to a header value (a VPI/VCI value of a cell header in a case of ATM) that can be processed at high speed.

Then, the transfer processing for subsequent packets belonging to that packet flow are carried out according to the stored header value that can be processed at high speed. By carrying out the above processing at each router on the route of the packet flow, it becomes possible to carry out the fast transfer (referred to as a cut-through transfer hereafter) processing for packets other than the first few packets. Also, by notifying a request on the communication quality from an end-host, it also becomes possible to provide a cut-through path that satisfies a requested communication quality with respect to an end-to-end flow.

The above described packet transfer control method sets up a cut-through path for each communication between specific transmitting host and receiving host, for example, so that a number of cut-through paths to be managed by the router can be potentially large. Also, there is a need to carry out the address analysis processing for each packet just as in the conventional router until the cut-through path is established, so that there can be a router at which the address analysis processing for each packet may cause the bottleneck.

For this reason, there is also a proposition of a method in which a cut-through path between specific routers is set up in advance at a time of the network activation, for example, instead of setting up a dedicated cut-through path for a specific end-to-end packet flow at a time of detecting that packet flow. In this case, it is impractical to set up a cut-through path dedicatedly with respect to every conceivable end-to-end packet flow, so that a cut-through path will be set up to have a general availability (such that all packet flows destined to a specific logical network from one router can use it commonly, for example). Consequently, various end-to-end packet flows are going to share the cut-through path formed from one router to another router of another logical network.

In this method, it is possible to eliminate a possibility for causing the bottleneck due to the conventional address analysis processing until the cut-through path is formed as encountered in the earlier described method. However, in this method, when a scale of the network is increased, a number of cut-through paths to be set up in advance also increases, so that it is preferable to limit a number of cut-through paths to a reasonable level (such that the cut-through path is set up in advance only for those packet flows which are destined to a logical network which is known to have a large traffic, for example). In such a case, when some end-to-end packet flow occurs, if there is no cut-through path set up in advance on the route of that packet flow, the conventional transfer processing based on the address analysis for each packet must be carried out at routers on that route, and therefore the problem of the performance bottleneck arises again.

Also, in this method for setting up a cut-through path with a certain degree of general availability, it is impossible to provide a dedicated cut-through path that satisfies the requested communication quality with respect to a specific end-to-end packet flow.

SUMMARY OF THE INVENTION

It is therefore an object of the present invention to provide a packet transfer control method and a node device which are capable of providing a dedicated cut-through path for a specific end-to-end packet flow, while reducing a time required until the cut-through path is established, so as to be able to reduce the load of the address analysis processing at the router.

According to one aspect of the present invention there is provided a method for transferring packets from one node belonging to one logical network, comprising the steps of: storing at said one node an information indicating an existence of a first dedicated virtual path for transferring packet flows specified by a first condition, which is capable of transferring packets without applying a network layer processing up to another node belonging to another logical network different from said one logical network; and communicating an identifier information for identifying a second dedicated virtual path for transferring a packet flow specified by a second condition which is more specific than the first condition by utilizing the first dedicated virtual path, and a condition information for indicating the second condition, in order to set up the second dedicated virtual path up to a termination point node of the first dedicated virtual path or a further downstream side node, between said one node and the termination point node.

A datalink layer of a network to which the present invention applies can be any of the Ethernet, point-to-point link, ATM, frame relay, etc. Also, a network layer protocol can be any of the IP, IPX, etc.

According to the present invention, the first dedicated virtual path (cut-through path) is set up in advance for packet flows specified by the first condition, so that packets belonging to these packet flows can be transferred from the own node to another node which is not a neighboring node of the own node, without applying the network layer processing at intermediate nodes between them.

In a case of ATM, for example, this first dedicated virtual path can be a cut-through formed by a VP (Virtual Path, in which a plurality of VCs (Virtual connections) are contained) or a cut-through formed by a plurality of PVCs (Permanent Virtual Connections). Also, in a case of Ethernet, for example, this first dedicated virtual path can be a cut-through realized by transferring a MAC frame with a value indicating the first dedicated virtual path registered in a specific region, and routing the MAC frame by referring or rewriting this specific region with a higher priority over another specific region to be described below, without applying the network layer processing.

Then, when a need arises to set up a second dedicated virtual path for transferring a packet flow specified by the second condition which is more specific than the first condition, the information for identifying the second dedicated virtual path and the information for indicating the condition for specifying a specific packet flow to be transferred by the second dedicated virtual path are communicated between the own node and the termination point node of the first dedicated virtual path, so that both of the own node and the termination point node can recognize the second dedicated virtual path for the specific packet flow to be specified by the second condition.

This second condition for specifying the specific packet flow to be transferred by the second dedicated virtual path is more specific than the first condition. For example, when the first condition to have a specific logical network as a destination, the second condition is to have a specific node belonging to that specific logical network as a destination, or to have a specific application (port) of that specific node as a destination, or else to have another specific node as a source and that specific node as a destination, etc.

Note here that there can also be cases in which the first condition specifies packet flows from a plurality of nodes to a particular single node while the second condition specifies a packet flow from one of these plurality of nodes to that particular single node.

This second dedicated virtual path can be one of a plurality of virtual paths which are contained in the first dedicated virtual path. For example, one of a plurality of VCs contained in the VP or one of a plurality of PVCs can be selected as the second dedicated virtual path. In a case of Ethernet, the second dedicated virtual path is used by transferring a MAC frame in which a value for indicating the second dedicated virtual path is registered into the aforementioned another specific region.

Note that the communication between the own node and the termination point node of the first dedicated virtual path in the present invention can be realized by a notification of the necessary information from the own node to the termination point node, or by a notification of the necessary information from the termination point node to the own node, or else by a request for the necessary information from the own node to the termination point node and a notification of the necessary information in response from the termination point node to the own node.

After this communication, the own node transfers those packets which satisfy both of the first condition and the second condition by the second dedicated virtual path, and transfers those packets which satisfy the first condition but not satisfy the second condition by the first dedicated virtual path other than the second dedicated virtual path.

Then, the second dedicated virtual path (cut-through path) can be extended to the upstream side or the downstream side beyond a section in which the first dedicated virtual path is set up.

In a case of extending the second dedicated virtual path to the upstream side, the own node stores a correspondence between the second dedicated virtual path and an upstream side dedicated virtual path dedicated to a specific packet flow that is to be transferred by the second dedicated virtual path, if such an upstream side dedicated virtual path exists on an upstream side of the own node, and transfers packets belonging to that specific packet flow to the second dedicated virtual path without applying the network layer processing, according to the stored correspondence.

In a case of extending the second dedicated virtual path to the downstream side, the termination point node stores a correspondence between the second dedicated virtual path and a downstream side dedicated virtual path dedicated to a specific packet flow that is to be transferred by the second dedicated virtual path, if such a downstream side dedicated virtual path exists on a downstream side of the termination point node, and transfers packets belonging to that specific packet flow to the downstream side dedicated virtual path without applying the network layer processing, according to the stored correspondence.

Note also that the communication between the own node and the termination point node can be realized by transmitting the identifier information and the condition information by using the first dedicated virtual path.

According to another aspect of the present invention there is provided a node device for one node belonging to one logical network, comprising: a memory unit for storing an information indicating an existence of a first dedicated virtual path for transferring packet flows specified by a first condition, which is capable of transferring packets without applying a network layer processing up to another node belonging to another logical network different from said one logical network; and a communication unit for communicating an identifier information for identifying a second dedicated virtual path for transferring a packet flow specified by a second condition which is more specific than the first condition by utilizing the first dedicated virtual path, and a condition information for indicating the second condition, in order to set up the second dedicated virtual path up to a termination point node of the first dedicated virtual path or a further downstream side node, between said one node and the termination point node, by referring to a stored content of the memory unit.

As described, according to the present invention, the set up of the second dedicated virtual path dedicated to a packet flow specified by the more specific second condition can be realized by utilizing the first dedicated virtual path which is set up in advance, so that the cut-through path dedicated to a specific end-to-end packet flow can be provided by a short set up time.

Other features and advantages of the present invention will become apparent from the following description taken in conjunction with the accompanying drawings.

BRIEF DESCRIPTION OF THE DRAWINGS

FIG. 3 is a diagram showing one example of an IP routing table used by an ATM connected router in the router network of FIG. 2.

FIG. 5 is a diagram showing one example of an ATM cell routing table used by an ATM connected router in the router network of FIG. 2.

FIG. 8 is a diagram showing one example of a virtual datalink header conversion table used by an Ethernet connected router according to the second embodiment of the present invention.

FIG. 9 is a diagram showing another example of a virtual datalink header conversion table used by an Ethernet connected router according to the second embodiment of the present invention.

FIG. 10 is a diagram showing one example of an IP routing table used by an Ethernet connected router according to the second embodiment of the present invention.

DETAILED DESCRIPTION OF THE PREFERRED EMBODIMENTS

Referring now to FIG. 1 to FIG. 7, the first embodiment of a packet transfer control method and a node device according to the present invention will be described in detail.

Figure 1:
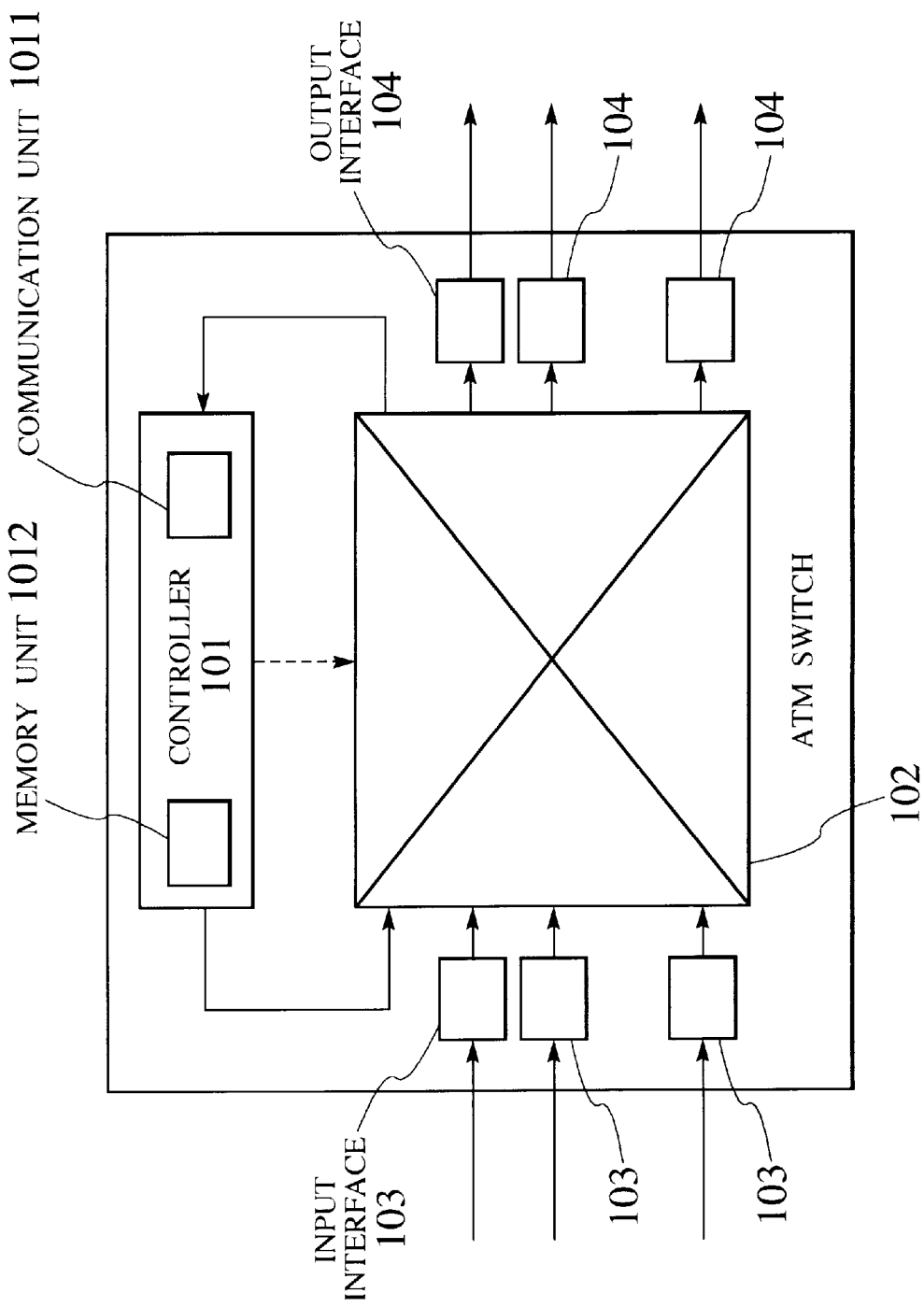
FIG. 1 is a block diagram showing an exemplary configuration of a router for realizing a packet transfer control method according to the the present invention.

FIG. 1 shows an exemplary configuration of a router which is capable of realizing the cut-through transfer processing. This first embodiment is directed to a case where the datalink connected to the router is the ATM, so that the router of FIG. 1 utilizes an ATM switch 102 for the purpose of realizing the high speed transfer processing using the cut-through.

Input interfaces 103 and output interfaces 104 are interfaces for carrying out ATM cell transmission and reception, which are to be connected with ATM exchange nodes, ATM routers, ATM hosts, etc.

A controller 101 has a communication unit 1011 which receives ATM cells received at the input interface 103 through the ATM switch 102, assemble a packet from the ATM cells, analyzes a destination address (and a source address) of the packet similarly as in the conventional router, and determines a next hop node (router or host) and a VPI/VCI value to be given to cells. Then, the communication unit 1011 of the controller 101 disassembles the packet into cells again and transmits the cells toward appropriate interfaces.

In addition to this transfer processing function of an ordinary router, the controller 101 also has a memory unit 1012 for storing a VPI/VCI value (an identifier of a dedicated virtual path) which is dedicatedly allocated to a specific packet flow by the message exchanges with a neighboring node. By using this information, it becomes possible to determine the next hop node and the VPI/VCI value to be given to cells at a time of output, from the VPI/VCI value of the received cells, without assembling the received cells into a packet and analyzing the flow information (a network layer address information, etc.) described in the assembled packet.

Consequently, in such a case, it becomes possible to relay the received cells by transferring them to a next hop node using only the ATM switch 102, without requiring the analysis processing at the controller 101, and therefore it becomes possible to realize the high speed and high throughput transfer processing by the ATM switch 102.

A condition for specifying packet flows that can utilize such a cut-through path can be given at various levels. When such packet flows are specified by a looser, less specific condition, a number of packet flows which utilize that cut-through path will be increased as much, whereas when such packet flows are specified by a tighter, more specific condition, a number of packet flows which utilize that cut-through path will be decreased as much.

Here, an exemplary case of using the following two types of cut-through paths will be described.

(1) A cut-through path which is dedicated to a specific end-to-end packet flow or to a packet flow of a specific application for specific end nodes.

(2) A cut-through path which can be shared by various packet flows (may be end-to-end or not end-to-end) destined to a certain destination logical network, without limiting the packet source and the destination host address.

Note that an exemplary case of using an end-to-end packet flow in the above (1) will be described here, but it is not absolutely necessary to use an end-to-end packet flow in the above (1), and it suffices to use a packet flow which is defined by a more specific condition than that of the above (2).

The former type of the cut-through path can be used as follows. The router usually assembles a packet at the controller 101 from the ATM cells received at the input interface 103, and transfers the packet to a next hop node according to the flow information analysis processing result. Then, only when the controller 101 detects a specific end-to-end packet flow (or a packet flow of specific application for specific end nodes), prescribed control messages are exchanged with a neighboring node and this flow is set to be transferred by the cut-through transfer at the ATM switch 102 when VCs (Virtual channels) dedicated to this end-to-end packet flow are established with respect to the previous hop and the next hop.

The latter type of the cut-through path can be used as follows. The cut-through path dedicated for packet flows destined to a specific destination logical network is set up in advance at a time of network activation, for example, so that the (end-to-end) packet flow destined to that specific destination logical network will be transferred at high speed starting from the first packet. On the other hand, for a (end-to-end) packet flow destined to another destination to which this cut-through path is not set up in advance, the conventional transfer based on the packet analysis at the controller 101 will be carried out from the beginning to the end.

In the following, a method for constructing a router network by combining these two types of cut-through paths effectively so as to take full advantages of both in realizing a high scalability and an improved performance will be described.

Here, an exemplary case of using the IP (Internet protocol) as the network layer protocol will be described, so that the logical network will be referred to as a subnet.

Figure 2:
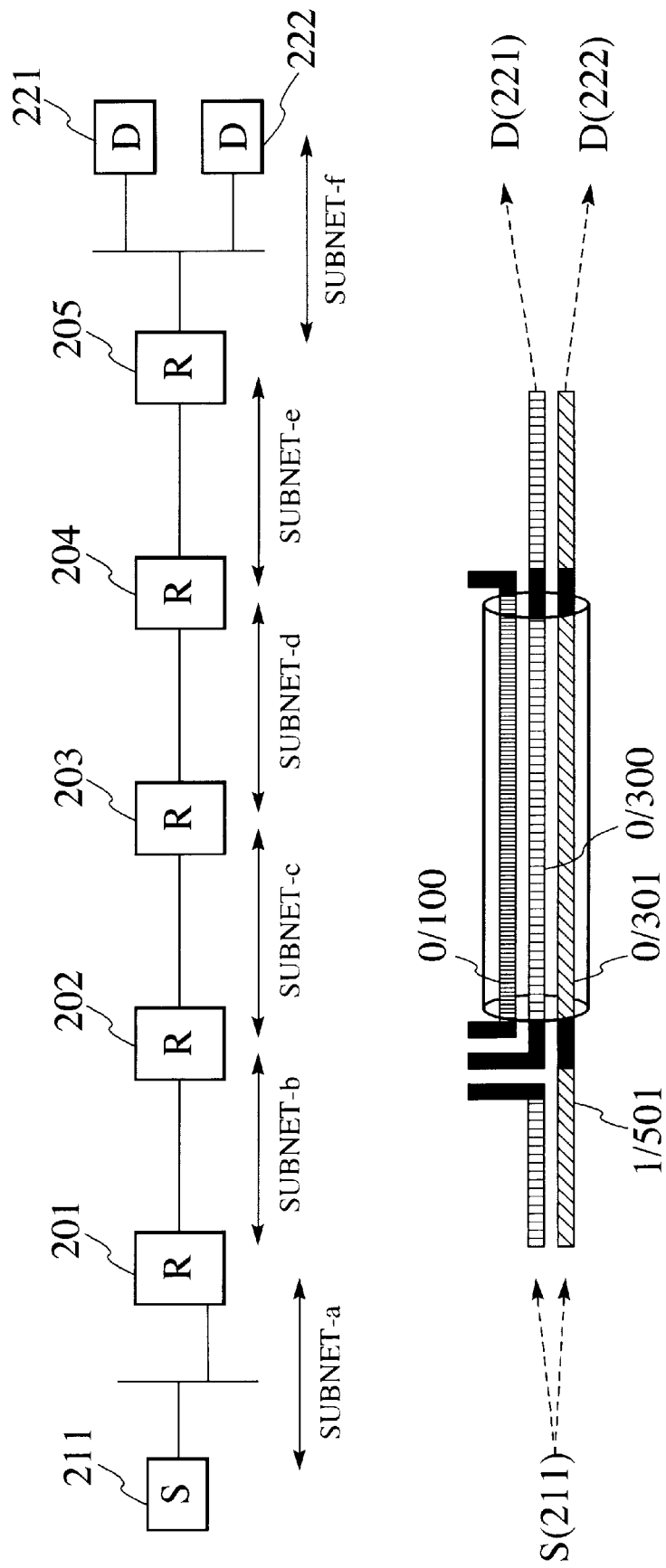
FIG. 2 is a diagram showing one exemplary configuration of a router network according to the first embodiment of the present invention.

FIG. 2 shows an exemplary configuration of the router network formed by subnet-a to subnet-f and an ATM cut-through path provided between routers 202 and 204, in a case of transferring packets from a transmitting host 211 to receiving hosts 221 and 222 through five routers 201 to 205.

Here, the transmitting host 211 belongs to the subnet-a, the router 201 belongs to the subnet-a and the subnet-b, the router 202 belongs to the subnet-b and the subnet-c, the router 203 belongs to the subnet-c and the subnet-d, the router 204 belongs to the subnet-d and the subnet-e, the router 205 belongs to the subnet-e and the subnet-f, and the receiving hosts 221 and 222 belong to the subnet-f. It is also assumed that the subnet-a and the subnet-f are formed by Ethernets, and the other subnets are formed by ATMs.

An ATM cut-through path is set up in advance from the router 202 via the router 203 to the router 204, and this ATM cut-through path can be utilized by any packet which passes through the router 202 and has the destination subnet address "f".

At the ATM interface (whose interface number is assumed to be "2") of the router 202 with respect to the subnet-c identifies this cut-through path by a VPI value "0". Namely, the ATM cut-through path to be set up in advance and shared by various end-to-end packet flows having the destination subnet address "f" is formed by connecting a VP (Virtual Path) set up between the routers 202 and 203 and a VP set up between the routers 203 and 204 at the router 203 on the ATM level.

The router 203 only refers to the VPI values of the entered cells, and transfers these cells to the next hop router 204 without assembling them into a packet.

This cut-through path from the router 202 to the router 204 which is formed by connecting VPs as described above will be referred to as a VP cut-through. In this VP cut-through, various end-to-end packet flows having the destination subnet address "f" are flowing. Now, a method for constructing a cut-through path dedicated to a specific end-to-end packet flow (or a packet flow of a specific application for specific end nodes) among these flows on-demand will be described.

In FIG. 2, a cut-through path dedicated to a packet flow from the transmitting host 211 to the receiving host 222 is set up from the router 201 to the router 205. This cut-through path can be formed by connecting a VC (dedicated to the packet flow from the transmitting host 211 to the receiving host 222) from the router 201 to the router 202 with a VC (dedicated to the packet flow from the transmitting host 211 to the receiving host 222) from the router 202 to the router 204 at the router 202 on the ATM level, and similarly connecting that VC from the router 202 to the router 204 with a VC (dedicated to the packet flow from the transmitting host 211 to the receiving host 222) from the router 204 to the router 205 at the router 204 on the ATM level.

This cut-through path from the router 201 to the router 205 which is formed by connecting VCs as described above will be hereafter referred to as a VC cut-through. Each of the router 202 and the router 204 only refers to the VPI/VCI values of the entered cells, and transfers these cells to the next hop router by attaching a prescribed VPI/VCI value, without assembling them into a packet. As already mentioned above, the router 203 can carry out the transfer processing according to the VPI value of the entered cells alone.

In this example, at a time of constructing the VC cut-through from the router 201 to the router 205 dedicatedly for a packet flow between the transmitting host 211 and the receiving host 222, the VP cut-through dedicated to packet flows destined to the subnet-f (which conveys the packet flows specified by a broader condition that contains the condition for specifying the packet flow conveyed by the VC cut-through) that is already set up between the routers 202 and 204 is utilized, so that the control protocol can be operated as if the router 204 is the next hop neighboring node of the router 202 at a time of generating the VC cut-through.

In this way, it is possible to shorten the time required for the VC cut-through generation compared to a case of carrying out a VC cut-through generation procedure at every router on the route, and therefore it is possible to reduce the packet processing load at each router.

Figure 4:
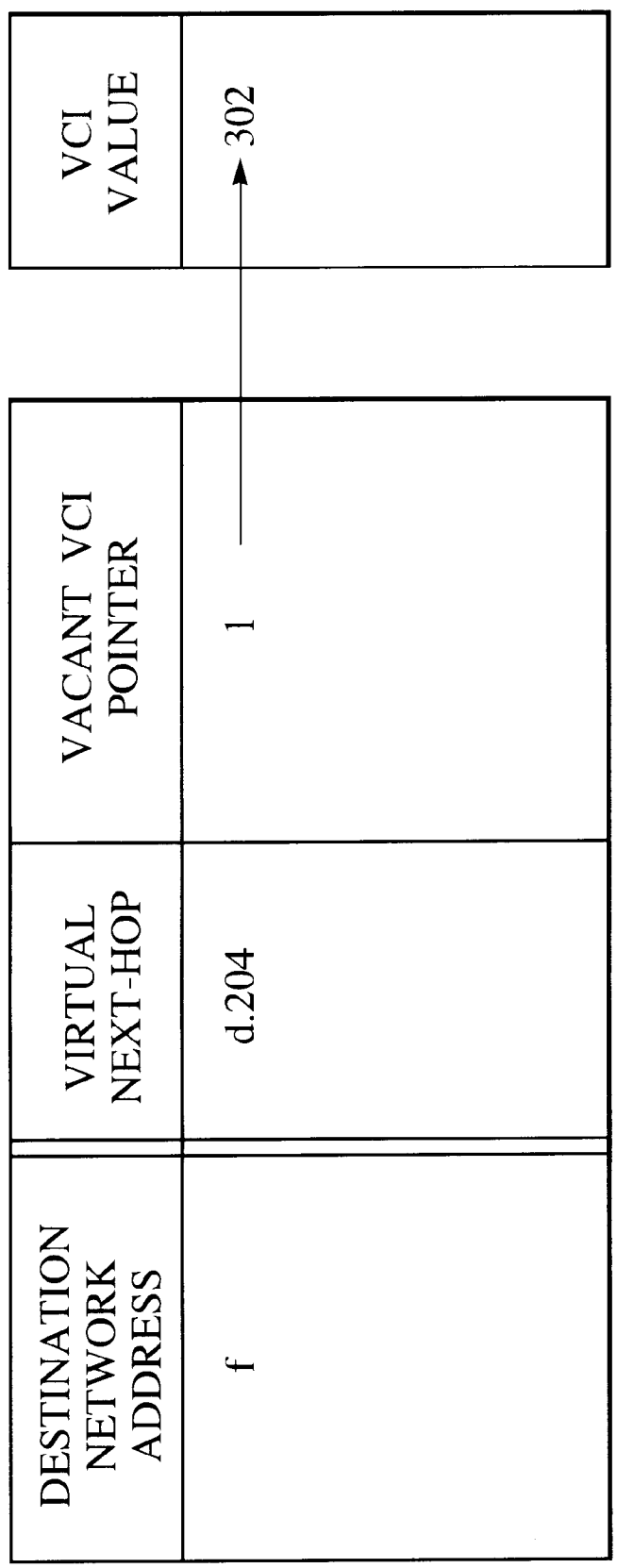
FIG. 4 is a diagram showing one example of a vacant VC management table used by an ATM connected router in the router network of FIG. 2.

FIG. 3 shows one example of an IP routing table held by the controller in the router 202 of FIG. 2, FIG. 4 shows one example of a management table for a vacant VCI value within the VP cut-through which is held by the controller in the router 202 of FIG. 2, and FIG. 5 shows one example of an ATM cell routing table which is to be referred by the ATM switch in the router 202 of FIG. 2.

Now, the cell/packet transfer processing procedure at the router 202 will be described in detail with references to FIG. 2 to FIG. 5.

Here, it is assumed that the VP cut-through (which can be utilized by the packet flows specified by the condition given solely in terms of the destination subnet address) that is set up in advance is already existing but no other VP cut-through is existing between the routers 202 and 204.

When the router 202 tries to receive cells from the neighboring router 201 that belongs to the subnet-b, the router 202 first refers to the ATM cell routing table of FIG. 5 by using the VPI/VCI value of the received cell as a key. In the ATM cell routing table, there is an entry orresponding to the VC cut-through dedicated to the packet flow between the transmitting host 211 and the receiving host 222 as shown in FIG. 2, which registers that "input interface=1" and "input VPI/VCI=1/501" in correspondence to "output interface=2" and "output VPI/VCI=0/301".

Note that, although not shown in FIG. 2, when the router 202 has a role of relaying the VP cut-through, there will also be a corresponding entry in the ATM routing table, which registers only the input VPI value and the output VPI value in correspondence (since the router that relays VP is not concerned with the input/output VCI values).

When the output entry corresponding to the VPI/VCI value of the received cell is not registered (or when the controller is indicated as the output interface), the received cell is transferred to the controller and assembled into a packet there. Then, the controller refers to the IP routing table of FIG. 3 by using the source IP address and the destination IP address (and possibly the destination port number if necessary) of the assembled packet as a key, and the output interface, the VPI/VCI value to be attached at a time of output, and the virtual next hop node address are obtained as a result.

Here, when the VP corresponding to the output VPI value constitutes the VP cut-through, the next hop node is a node at a termination point of that VP cut-through, whereas when the VP corresponding to the output VPI value does not constitutes the VP cut-through, the next hop node is an actual next hop node across the subnet.

The operation to register the address of a node at a termination point of the VP cut-through as this virtual next hop node address is already carried out when the VP cut-through was formed. As shown in FIG. 3, according to the virtual next hop node field, it can be seen that the acket having the destination subnet address "f" will be utputted from the output interface "2" as a cell attached with "VPI/VCI=0/100", and ATM transferred up to the router 204 by the VP cut-through.

In addition, besides the packet flows specified by the destination subnet address "f", the IP routing table of FIG. 3 also registers an IP routing table information of "output interface=2" and "output VPI/VCI=0/300" in correspondence to the packet flow specified by "source address= a.211" and "destination address =f.221".

These two entries are similar in a sense that both of them have the destination subnet address "f", but the latter one is for the packet flow specified by the more specific (detailed) condition, and at a time of the table referring, the content of the entry which matched by the most detailed condition (the best matched entry) will be followed.

In an example of FIG. 3, all the packets with the destination subnet address "f" other than those having the source address "a.211" and the destination address "f.221" will be transmitted through "VPI/VCI=0/100", terminated at the virtual next hop router 204 (at the address "d.204") and IP processed there. In other words, "VPI/VCI=0/100" plays a role of the default VC for the packets destined to the subnet-f.

The packet flow having the source address "a.211" and the destination address "f.221" is transmitted through "VPI/VCI=0/300", where this VC is inter-connected with the VC dedicated to the packet flow of the same source and destination IP addresses that is set up between the routers 204 and 205 in the example of FIG. 2, so that this packet flow will be transferred without the IP processing by the VC cut-through up to the router 205.

Note that, in the example of FIG. 2, if a VC dedicated to the packet flow having the source address "a.211" and the destination address "f.221" is also set up between the routers 201 and 202, it also becomes possible to realize the cut-through transfer at the router 202 by connecting that VC with the VC outputted with "VPI/VCI=0/300", without assembling the packet.

As a result of the flow information analysis for the received packet at the controller of the router 202, when the router 202 judges that a VC cut-through dedicated to the end-to-end packet flow to which the analyzed packet belongs does not exist (only a VC for the default transfer to the next hop router 203 or a VC for the default transfer within the VP cut-through to the virtual next hop router 204 exists), and it is preferable to set up a VC cut-through dedicated to this end-to-end packet flow, the following VC cut-through set up procedure is started. Note that, in such a case, it is preferable to transfer the received packet itself by using either one of the VCs for the default transfer mentioned above (VPI/VCI=0/100 in the example of FIG. 2).

In the VC cut-through set up procedure, the controller of the router 202 refers to the IP routing table by using the network address portion of the destination IP address of the end-to-end packet flow for which the VC cut-through is to be set up as a key, reserves a VC dedicated to this end-to-end packet flow between this router 202 and a node indicated by the virtual next hop node field, and exchanges the prescribed control messages with that node.

For example, in a case of setting up a VC cut-through dedicated to the end-to-end packet flow to be transmitted from the transmitting host 211 of FIG. 2 to another receiving host 223 belonging to the subnet-f which is not shown in FIG. 2, the router 202 can recognize that the virtual next hop node of the default route to the destination subnet-f is the router 204, that is, that the VP cut-through is already set up from the router 202 to the router 204. Consequently, the router 202 carries out the VC cut-through set up procedure by regarding the router 204 as the next hop neighboring node.

Here, an exemplary VC cut-through set up procedure at the router 202 is as follows. First, the router 202 refers to the management table of FIG. 4 for a vacant VCI value within the VP cut-through already set up to the router 204 by using the destination network address as a key, and notifies the correspondence between the VCI value "302" and the end-to-end packet flow (of the source address "a.211" and the destination address "d.223" in this example) registered therein to the router 204 as a control message. For the transmission of this control message, the VC (VPI/VCI=0/100) for the default transfer is used.

Then, a response from the router 204 is awaited, and when a message indicating a permission to set up that correspondence is received from the router 204, the router 202 interprets this as an indication that a VC dedicated to the end-to-end packet flow between the transmitting host 211 and the receiving host 223 is reserved at least between this router 202 and the virtual next hop router 204, so that the packets of that packet flow can be set to flow into the reserved dedicated VC (VPI/VCI=0/302).

When the procedure for setting up the VC cut-through dedicated to the end-to-end packet flow between the transmitting host 211 and the receiving host 223 is completed between the routers 202 and 204, and the similar procedure is also completed between the routers 204 and 205 as well as between the routers 201 and 202, it becomes possible to set up the VC cut-through from the router 201 to the router 205.

Note that, in the above described example, an exemplary case in which the upstream side node (router 202) activates the set up of the cut-through with respect to the downstream side node (router 204) has been described, but it is also possible to adopt a scheme in which the downstream side node activates the set up of the cut-through with respect to the upstream side node. In such a case, the downstream side node will manage a vacant VCI value within the VP cut-through between the routers 202 and 204. Similarly, it is also possible to adopt a scheme in which the upstream side node activates the set up of the cut-through with respect to the downstream side, while the downstream side manages a vacant VCI value within that cut-through.

As described, in a case of trying to set up a new VC cut-through in a form of passing through (utilizing) the already set up VP cut-through, it is necessary for the router which is at a starting point of that VP cut-through to recognize an address of a router at a termination point of the VP cut-through and carry out the control message exchange for the VC cut-through set up with respect to that router as the virtual neighboring node. To this end, it is necessary for the starting point router to constantly store the address of the termination point router of the already set up VP cut-through.

This can be realized by a scheme in which the protocol for the VP cut-through set up always notifies the termination point node address to the starting point node, or by a scheme in which a message for checking the termination point address is defined in the default VC within the VP cut-through, or else by a scheme in which the OAM information of the ATM is utilized for this purpose.

Note that, in a case of adopting a scheme in which the downstream side node activates the cut-through set up with respect to the upstream side node, the router at the termination point of the VP cut-through will recognize the address of the starting point router of the VP cut-through, and carry out the operation by regarding that starting point router as the virtual neighboring node.

The first embodiment described above so far is directed to a case of using the VP cut-through formed by connecting VPs as a cut-through to be set up in advance for those packet flows which are specified by a relatively abstract (loose) condition such as that on the destination network address. In particular, the above description is directed to a method for using a certain VCI value within the VP as a connection for the default packet transfer and the control message transfer, for the purpose of generating a cut-through for a packet flow specified by the more specific (detailed) condition such as that on the source and destination address pair (and the destination port number), by reserving a vacant VCI value other than that default VCI value as a VC dedicated to that packet flow, when the need arises.

It is to be noted here that the similar end result as described above can also be realized by using a VC cut-through formed by connecting VCs rather than VPs as a cut-through to be set up in advance for those packet flows which are specified by a relatively abstract condition.

In this case, in addition to a VC cut-through for the default packet flow transfer specified by a relatively abstract condition which is to be set up in advance, other VC cut-throughs are prepared as parts for forming a VC cut-through for a packet flow specified by the more specific condition whose set up may be requested later on. A set of these prepared VC cut-throughs will be a dedicated virtual path that is dedicated to those packet flows which are specified by the aforementioned relatively abstract condition.

Figure 6:
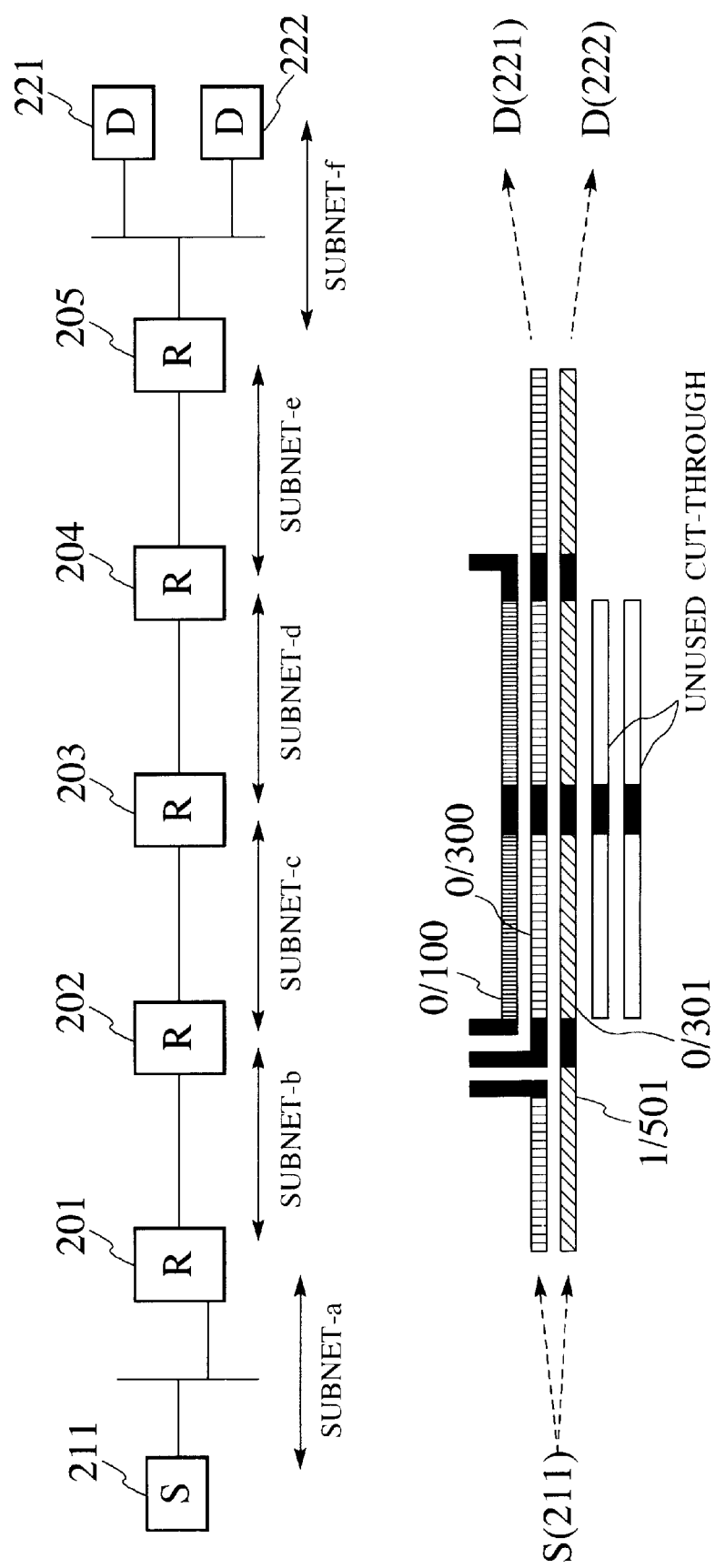
FIG. 6 is a diagram showing another exemplary configuration of a router network according to the second embodiment of the present invention.

For example, as shown in FIG. 6, a VC cut-through (VPI/VCI=0/100) for transferring the default flow having the destination subnet address "f" among the routers 202, 203 and 204 is set up, while at the same time a pool of similar VC cut-throughs (VPI/VCI=0/301 and other unused cut-throughs) among the routers 202, 203 and 204 are also set up and maintained.

Later on, at a time of setting up a VC cut-through specified by the transmitting host 211 and the receiving host 223 (of the address "f.223) between the routers 201 and 205, for example, the unused VC cut-throughs between the routers 202 and 204 which are pooled as described above can be utilized as parts.

This method requires the switching in VC units at the router 203 as well, unlike the previously described case of using VPs, but there is no need for the router 203 to participate in the control procedure at a time of setting up the VC cut-through for the end-to-end packet flow specified by the detailed condition, and it suffices to carry out the control message exchanges between the routers 202 and 204 which are at the end points of the prepared VC cut-throughs.

Note that, in this method, because of the switching in VC units at the router 203, the VCI value of one VC cut-through is usually different at the router 202 and at the router 204.

For example, the VPI/VCI value shown in FIG. 6 is a value recognized at the router 202, and the router 204 recognizes this same VC cut-through by a different VPI/VCI value. Consequently, for each one of the pooled VC cut-throughs, the negotiation regarding the VC cut-through ID should be carried out between the routers 202 and 204 in advance so that it can be uniquely recognized.

Namely, the router 202 selects some ID value and notifies the router 204 that "it wishes to set up the VC cut-through between the routers 202 and 204 by using this VC cut-through ID value" in a form of a message, and then receives a message indicating a permission from the router 204, for example. By executing this operation after the router 203 makes the setting for connecting a VC from the router 202 and a VC to the router 204 at the ATM level, it becomes possible for both of the routers 202 and 204 to recognize this one VC cut-through by the identical VC cut-through ID value.

Then, the router 202 stores each such VC cut-through ID value, and the VC cut-through ID value will be used instead of the VCI value used in the case of using VPs, as an information for specifying a VC cut-through selected from the unused VC cut-throughs, in the control message for communicating with the router 204 at a time of setting up a VC cut-through for the end-to-end packet flow specified by the detailed condition.

It is also to be noted here that the similar end result as described above can also be realized by setting the hierarchical order among cut-throughs by way of setting a boundary of hierarchical levels at arbitrary portion in the VPI/VCI field, instead of setting the hierarchical order among cut-throughs by way of using the existing hierarchical structures such as VP and VC as described above. In such a case, it is also possible to set three or more hierarchical levels by defining two or more boundaries. Note however that, when three or more hierarchical levels are set, it is necessary to exchange the information that indicates a value up to which bit of the cell header region is to be used in recognizing each cut-through, at a time of setting up a cut-through.

Figure 7:
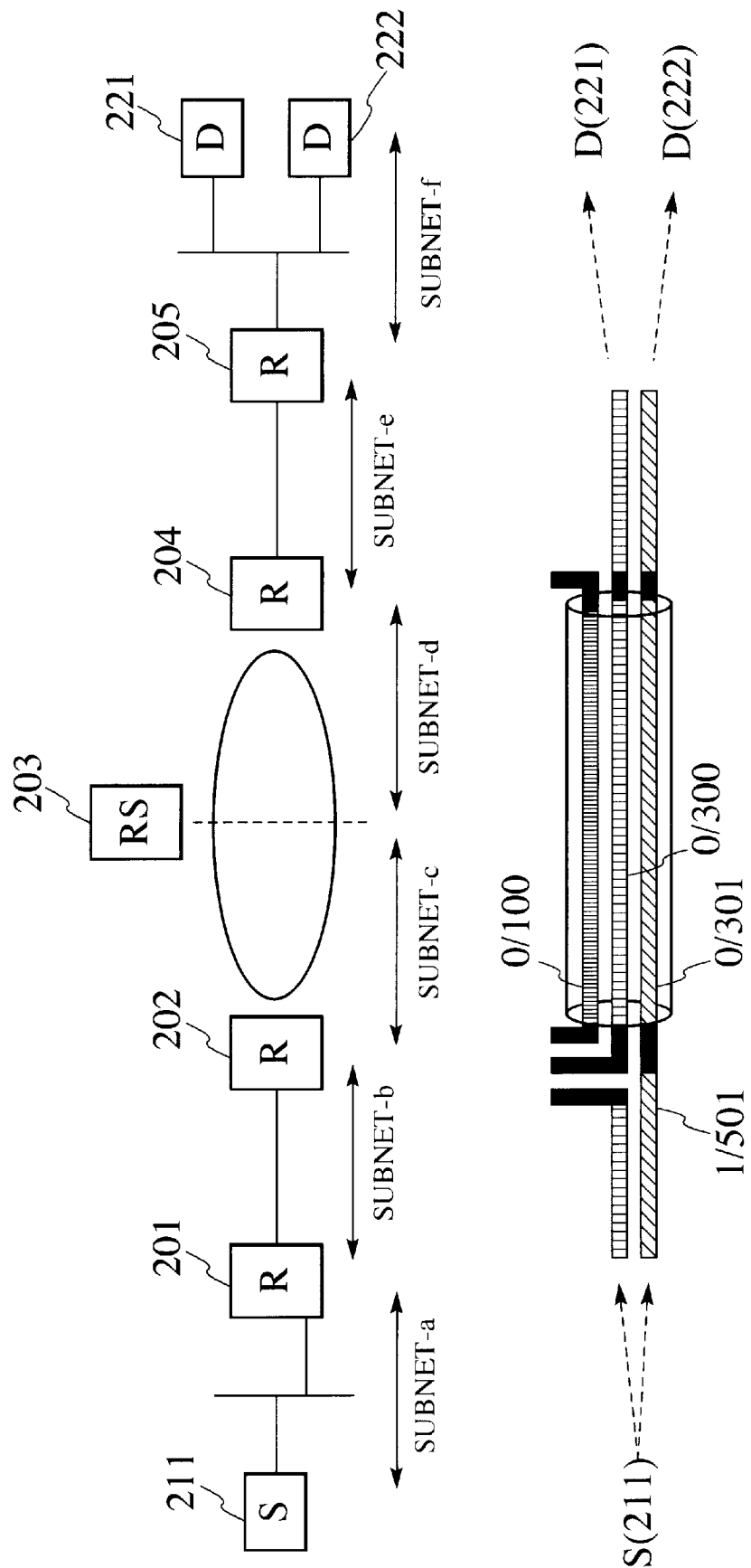
FIG. 7 is a diagram showing another exemplary configuration of a router network according to the second embodiment of the present invention.

It is also to be noted here that the above description has been based on an exemplary network configuration shown in FIG. 2, but the present invention as described so far is equally applicable to a case of using a network configuration as shown in FIG. 7.

In FIG. 7, the router 203 also has a route server (RS) function, and a VP or VC dedicated to those packet flows having the destination network address "f" is set up between the routers 202 and 204 by using a procedure such as NHRP (Next Hop Resolution Protocol). Then, at a time of setting up a VC cut-through for a packet flow specified by the more specific condition (such as that on the source address "a.211" and the destination address "f.222"), the routers 202 and 204 carry out the exchange of the control messages as neighboring nodes, and as a result, a VC cut-through between the routers 201 and 205 which has a VC between the routers 202 and 204 as its part can be constructed.

Figure 8:
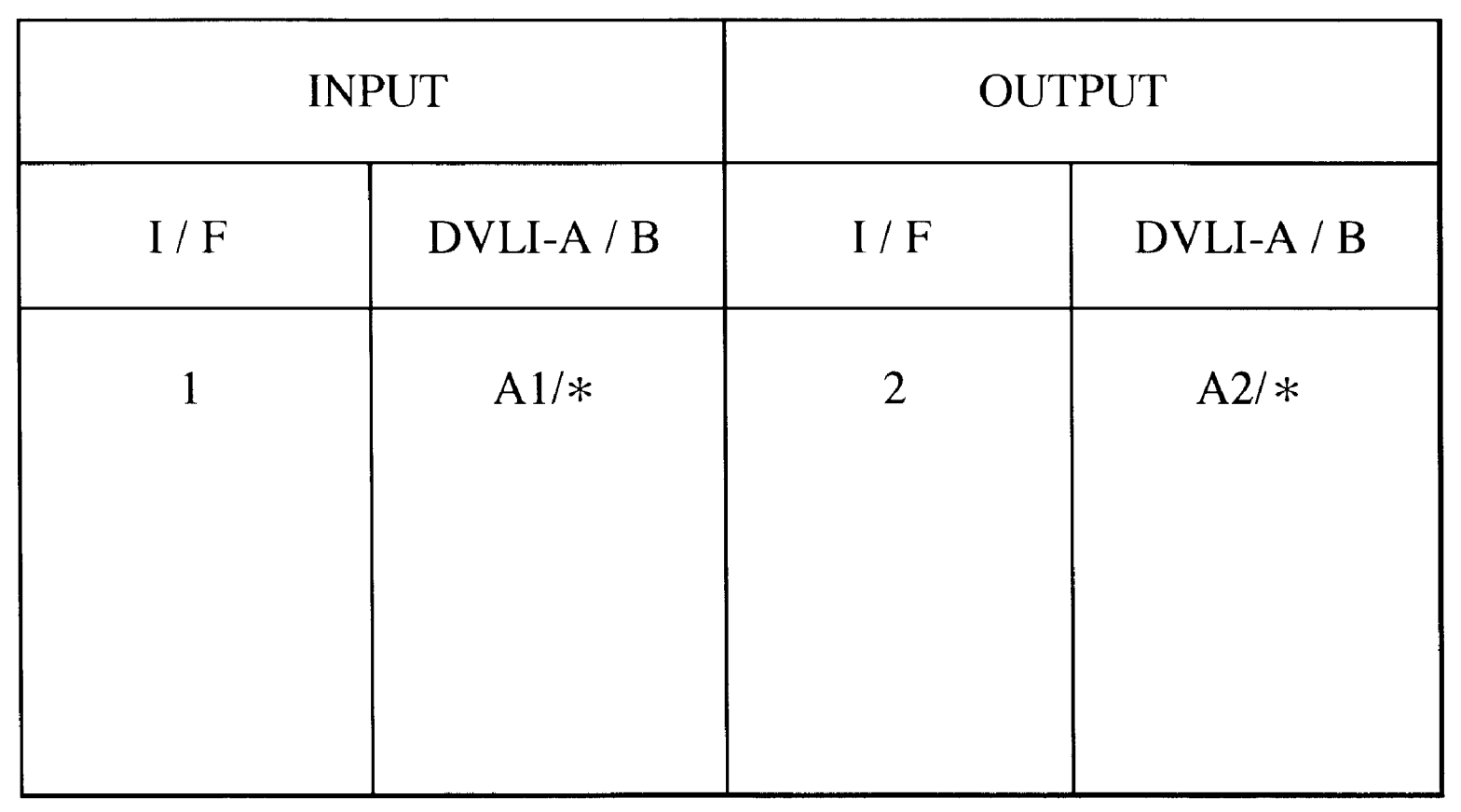
Figure 11:
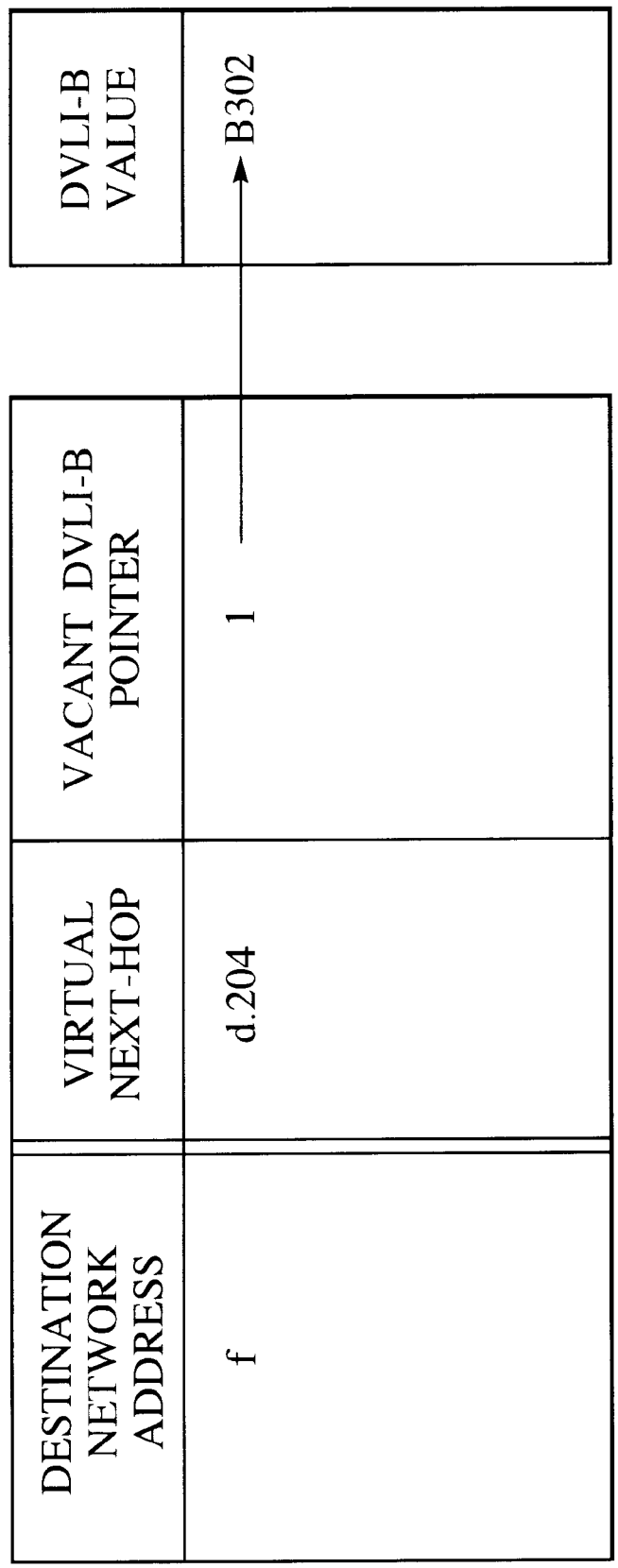
FIG. 11 is a diagram showing one example of a vacant virtual datalink management table used by an Ethernet connected router according to the second embodiment of the resent invention.

Referring now to FIG. 8 and FIG. 11, the second embodiment of a packet transfer control method and a node device according to the present invention will be described in detail. This second embodiment is directed to a cut-through control procedure in the communication network other than ATM, such as Ethernet.

In this second embodiment, instead of VPI used in the first embodiment for the ATM case, a first specific field is provided in a MAC frame for the purpose of registering a virtual datalink identifier called DVLI-A (Dedicated Virtual Link Identifier-A) to be dedicated to the transfer of a specific flow which is specified by a relatively abstract condition such as that on the destination network address and the like. In addition, instead of VCI used in the first embodiment for the ATM case, a second specific field is provided in a MAC frame for the purpose of registering a virtual datalink identifier called DVLI-B (Dedicated Virtual Link Identifier-B) to be dedicated to the transfer of a specific flow which is specified by a more detailed condition such as that on the source and destination IP address pair and the like.

In this case, it is assumed that all subnets in FIG. 2 are in forms of Ethernets, and a cut-through (which implies the transfer processing at a router using a header information of the datalink frame such as MAC header without using a processing of the network layer level such as IP processing in this case) from the router 202 to the router 204 is set up in advance. This cut-through is for the transfer of a specific flow which is specified by a relatively abstract condition such as that on the destination network address and the like.

In this state, as shown in FIG. 8, the router 203 stores a correspondence between a virtual datalink identifier DVLI-A value (assumed to be A1 here) that is agreed between the router 203 and the router 202 in the subnet-c and a virtual datalink identifier DVLI-A value (assumed to be A2 here) that is agreed between the router 203 and the router 204 in the subnet-d.

The router 203 transfers a data packet to a prescribed output interface without applying the flow analysis processing on the network layer while rewriting the virtual datalink identifier value to a value determined between the router 203 and the router 204 in advance, by looking up this table according to the virtual datalink identifier value A1 registered in the first specific field.

Here, suppose that the router 202 has received a data packet from the transmitting host 211 to the receiving host 222, and judged that a cut-through (according to a more specific condition) dedicated to the packet flow of this source and destination pair should be set up. Then, the router 202 carries out the exchange of the control messages with the router 204 in order to make an agreement on the virtual datalink identifier value to be registered into the second specific field described above. A value determined at this point will be assumed to be DVLI-B=B301 in the following.

The router 203 that receives a frame whose first specific field DVLI-A contains the virtual datalink identifier will use the above described cut-through to transfer the frame, without referring to or rewriting the virtual datalink identifier in the second specific field DVLI-B.

The router 202 will transfer packets belonging to the above described end-to-end packet flow by registering values A1 and B301 into the first and second specific fields, respectively.

The router 202 has a table of correspondence between the virtual datalink identifiers (and possibly interface numbers if necessary) registered in the first and second specific fields on the input side and the virtual datalink identifiers (and possibly interface numbers and also the other datalink header information such as source and destination MAC addresses if necessary) registered in the first and second specific fields on the output side, as shown in FIG. 9.

Then, if the agreed virtual datalink identifier (A0/B501 in FIG. 9) dedicated to the above described end-to-end packet flow is stored between the router 201 and the router 202, then the router 202 can transfer the packets of the above described flow by looking up the above described correspondence table according to that information (A1/B301 for the output side), and rewriting the necessary datalink headers without applying the network layer processing.

Note that, in this case, a table storing the virtual datalink identifier information to be given at a time of output when the IP processing is carried out at the router 202 appears as shown in FIG. 10, and a table (to be referred to at a time of exchanging the control messages) for managing a vacant DVLI value between the router 202 and the virtual neighboring router 204 at a time of generating a new cut-through from the router 202 appears as shown in FIG. 11, similarly as in the first embodiment for the case of ATM.

In this manner, even in the Ethernet, it is possible to set up an arbitrary cut-through with respect to the packet flow that is satisfying the above described condition and specified by a more specific condition, by utilizing a cut-through specified by a more abstract condition which is already existing.

As described, according to the present invention, at a time of generating a new dedicated virtual path with respect to a packet flow specified by a more detailed condition, such a new dedicated virtual path can be set up in a form of utilizing the dedicated virtual path for a packet flow defined by a more abstract condition which is already set up in advance, so that it is possible to shorten the time required for the generation of that new dedicated virtual path and therefore it is possible to reduce the packet processing load at each router, compared to a case of carrying out the a new dedicated virtual path generation procedure at every router on the route.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for transferring packets from one node belonging to one logical network, comprising the steps of:

storing at said one node an information indicating an existence of a first dedicated virtual path for transferring packet flows specified by a first condition, which is capable of transferring packets without applying a network layer processing up to another node belonging to another logical network different from said one logical network; and communicating an identifier information for identifying a second dedicated virtual path for transferring a packet flow specified by a second condition which is more specific than the first condition by utilizing the first dedicated virtual path, and a condition information for indicating the second condition, in order to set up the second dedicated virtual path up to a termination point node of the first dedicated virtual path or a further downstream side node, between said one node and the termination point node.

2. The method of claim 1, wherein the first dedicated virtual path contains a plurality of virtual paths, and the second dedicated virtual path is one of said plurality of virtual paths.

3. The method of claim 1, further comprising the step of:

transferring those packets which satisfy both of the first condition and the second condition by the second dedicated virtual path, and transferring those packets which satisfy the first condition but not satisfy the second condition by the first dedicated virtual path other than the second dedicated virtual path, after the communicating step.

4. The method of claim 1, further comprising the steps of:

storing at said one node a correspondence between the second dedicated virtual path and an upstream side dedicated virtual path dedicated to a specific packet flow that is to be transferred by the second dedicated virtual path, if said upstream side dedicated virtual path exists on an upstream side of said one node; and transferring packets belonging to said specific packet flow to the second dedicated virtual path without applying the network layer processing, according to said correspondence, at said one node.

5. The method of claim 1, further comprising the steps of:

storing at the termination point node a correspondence between the second dedicated virtual path and a downstream side dedicated virtual path dedicated to a specific packet flow that is to be transferred by the second dedicated virtual path, if said downstream side dedicated virtual path exists on a downstream side of the termination point node; and transferring packets belonging to said specific packet flow to said downstream side dedicated virtual path without applying the network layer processing, according to said correspondence, at the termination point node.

6. The method of claim 1, wherein the communicating step transmits the identifier information and the condition information by using the first dedicated virtual path.

7. The method of claim 1, further comprising the step of:

setting up the first dedicated virtula path prior to the storing step;

wherein the communicating step sets up the second dedicated virtual path on-demand.

8. A node device for one node belonging to one logical network, comprising:

a memory unit for storing an information indicating an existence of a first dedicated virtual path for transferring packet flows specified by a first condition, which is capable of transferring packets without applying a network layer processing up to another node belonging to another logical network different from said one logical network; and a communication unit for communicating an identifier information for identifying a second dedicated virtual path for transferring a packet flow specified by a second condition which is more specific than the first condition by utilizing the first dedicated virtual path, and a condition information for indicating the second condition, in order to set up the second dedicated virtual path up to a termination point node of the first dedicated virtual path or a further downstream side node, between said one node and the termination point node, by referring to a stored content of the memory unit.

9. The node device of claim 8, wherein the first dedicated virtual path indicated by the stored content of the memory unit contains a plurality of virtual paths, and the second dedicated virtual path identified by the identifier information communicated by the communication unit is one of said plurality of virtual paths.

10. The node device of claim 8, further comprising:

a transfer unit for transferring those packets which satisfy both of the first condition and the second condition by the second dedicated virtual path, and transferring those packets which satisfy the first condition but not satisfy the second condition by the first dedicated virtual path other than the second dedicated virtual path, after the communication unit communicated with the termination point node.

11. The node device of claim 8, further comprising:

a storing unit for storing a correspondence between the second dedicated virtual path and an upstream side dedicated virtual path dedicated to a specific packet flow that is to be transferred by the second dedicated virtual path, if said upstream side dedicated virtual path exists on an upstream side of said one node; and a transfer unit for transferring packets belonging to said specific packet flow to the second dedicated virtual path without applying the network layer processing, according to said correspondence stored by the storing unit.

12. The node device of claim 8, wherein when said one node is a termination point node of another dedicated virtual path for transferring packet flows specified by another condition, which is capable of transferring packets without applying a network layer processing up to said one node from a different node belonging to a different logical network, the communication unit also communicates the identifier information and the condition information in order to set up the second dedicated virtual path up to said one node or a further downstream side node, between said one node and said different node, and the node device further comprises:

a storing unit for storing a correspondence between the second dedicated virtual path and a downstream side dedicated virtual path dedicated to a specific packet flow that is to be transferred by the second dedicated virtual path, if said downstream side dedicated virtual path exists on a downstream side of said one node; and a transfer unit for transferring packets belonging to said specific packet flow to said downstream side dedicated virtual path without applying the network layer processing, according to said correspondence.

13. The node device of claim 8, wherein the communication unit transmits the identifier information and the condition information by using the first dedicated virtual path.

14. The node device of claim 8, wherein the first dedicated virtula path is set up prior to the storing by the memory unit, and the communication unit sets up the second dedicated virtual path on-demand.

* * * * *